United States Patent
Nagireddyvari et al.

(10) Patent No.: US 12,306,836 B2
(45) Date of Patent: May 20, 2025

(54) SYSTEMS AND METHODS FOR EXECUTING OPERATIONS ACROSS SENSITIVE DATA IN DATA CHANGE REPOSITORIES FOR SHARED DATA RESOURCES

(71) Applicant: Capital One Services, LLC, McLean, VA (US)

(72) Inventors: Naveen Reddy Nagireddyvari, McLean, VA (US); Divya Mehrotra, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 89 days.

(21) Appl. No.: 18/339,390

(22) Filed: Jun. 22, 2023

(65) Prior Publication Data
US 2024/0427772 A1    Dec. 26, 2024

(51) Int. Cl.
*G06F 16/2455*    (2019.01)
*G06F 16/2453*    (2019.01)
*G06F 16/248*    (2019.01)
*G06F 21/62*    (2013.01)

(52) U.S. Cl.
CPC .. *G06F 16/24553* (2019.01); *G06F 16/24542* (2019.01); *G06F 16/248* (2019.01); *G06F 21/6254* (2013.01)

(58) Field of Classification Search
CPC ......... G06F 16/24553; G06F 16/24542; G06F 16/248
USPC ....................................................... 707/718
See application file for complete search history.

(56) References Cited

U.S. PATENT DOCUMENTS

| | | | |
|---|---|---|---|
| 8,930,410 B2 * | 1/2015 | Alton | G06F 16/2455 707/802 |
| 9,311,369 B2 * | 4/2016 | Pattabhi | G06F 16/256 |
| 11,782,911 B1 * | 10/2023 | Speers | G06F 16/332 707/775 |

* cited by examiner

*Primary Examiner* — Kimberly L Wilson
(74) *Attorney, Agent, or Firm* — Foley & Lardner LLP

(57) ABSTRACT

Systems and methods utilize a data change repository that supplements existing data in a database by storing various data labels for each record. Each data label comprises a first data characteristic comprising a stateless value and a second data characteristic that comprises a modification characteristic of the stateless value. The systems and methods may then use these additional labels to identify and/or validate the underlying data. As the labels are used for the identification and/or validation (as opposed to the underlying data itself), the systems and methods do not affect, and function despite, security protocols, access restrictions, and/or viewing rights.

20 Claims, 8 Drawing Sheets

| List of Addresses Captured | Date |
|---|---|
| 9440 Stratton Dr, Frisco, TX 75035 | Jan 1, 2023 |
| 9440 Stratton Dr, Plano, TX 75035 | Jan 10, 2023 |
| 9441 Stratton Dr, Frisco, TX 75035 | Jan 12, 2023 |

252

| List of Addresses Captured | Date | Validation Results |
|---|---|---|
| 9440 Stratton Dr, Frisco, TX 75035 | Jan 1, 2023 | Secondary Adr info is missing (Apt number) |
| 9440 Stratton Dr, Frisco, NY 75035 | Jan 10, 2023 | State and Zip Mismatch |
| 9441 Stratton Dr, Frisco, TX 75035 | Jan 12, 2023 | Incorrect Street Number |

254

APPN_DIM,
APPN_FACT,
LOB_DIM,
SHARED_LKP_DIM,
APLCT_DIM,
APLCT_ADR_LOG,
SHARED_ADR_LOG,
ACCT_LOAN_DIM,
CUST_ACCT_DIM,
ACCT_ADR_FACT

Involves working with ~ 10 tables

Requires 175 to 200 Lines of Code

270
272
274

SYSTEMS AND METHODS FOR EXECUTING OPERATIONS ACROSS SENSITIVE DATA IN DATA CHANGE REPOSITORIES FOR SHARED DATA RESOURCES

BACKGROUND

The advent of electronic storage has vastly increased the amount and manner in which data may be stored. Furthermore, as electronic data and its use has become more routine, the transmission of data from one source to another has also become commonplace. In many instances, this transmission occurs in bulk. That is, large volumes of data are transmitted together in bulk from one storage location to another. However, these bulk transmissions are both resource intensive (e.g., requiring processing power, temporary storage, and communication infrastructure) and may expose the data to data loss, data corruption, and/or security risks.

SUMMARY

In view of the problems above, systems and methods are disclosed for maintaining a shared data repository. For example, as opposed to transmitting data from one location to another, the systems and methods described herein relate to maintaining data (e.g., in bulk) at a single location (or available via a single access point). That is, as opposed to requiring each system, application, and/or user to store a unique copy of a dataset, the systems and methods described allow each of these entities to share a common data resource.

However, numerous entities sharing a single data resource raise additional technical issues. First, data is rarely static. As such, for the data to be useful, the data requires continuous updates. That is, as the information represented by the data changes, the information must also be updated to reflect the changes. In many instances, these changes to the information represented by the data may be received by different systems, users, etc., throughout the entity. Accordingly, each system, application, and/or user may update the shared data resource. As different systems, applications, and/or users are each independently updating the data, these different systems, applications, and/or users must be relied on to correctly capture and/or input the changes. Failure to correctly capture and/or input the changes may cause the data to become inconsistent and/or out-of-date. Moreover, conventional techniques for accounting for these issues (e.g., maintaining access restrictions, read/write roles, etc.) cannot account for human error due to the incorrect capture and/or input.

Second, as the common data resource is shared between numerous entities, the manner and information captured by the data must be consistent across the entity. That is, each system, application, and/or user must enter information in the same manner as well as ensure that the same information is reflected by the same data. If each system, application, and/or user fails to do so, the common data resource may be populated with inconsistencies and/or redundancies. To further complicate the technical issues cited above, the data in the common data source may be populated with data with varying security protocols, access restrictions, and/or viewing rights, which may apply to both manual and automatic review.

Accordingly, systems and methods are described for maintaining a common data resource that is shared by numerous entities. In particular, the systems and methods may provide identification and/or validation of data in the common data resource in order to detect inaccuracies, inconsistencies and/or redundancies of the data. Moreover, the systems and methods do so in a manner that does not affect, and functions despite, security protocols, access restrictions, and/or viewing rights.

Specifically, the systems and methods utilize a data change repository that supplements existing data in a database by storing various data labels for each record. Each data label comprises a first data characteristic comprising a stateless value and a second data characteristic that comprises a modification characteristic of the stateless value. The systems and methods may then use these additional labels to identify and/or validate the underlying data. As the labels are used for the identification and/or validation (as opposed to the underlying data itself), the systems and methods do not affect, and function despite, security protocols, access restrictions, and/or viewing rights. For example, the stateless value may comprise data related to a user, entity, or other object (e.g., a name, address, serial number, etc.). The modification characteristic may comprise data related to a modification of the stateless value (e.g., when the data was last modified (or created), who last modified the data, what in the data was modified, etc.).

Furthermore, as the systems and methods comprise data labels for different characteristics of a record, the system may use these data labels to uniquely process different characteristics of the data in order to search, validate, and/or mask data. For example, the system may perform validations and/or other operations on the data labels while masking sensitive data from both use by the system and/or display to a user. This system may perform these validations and/or other operations despite masking sensitive data as the system may preserve a relationship between the first characteristic and second characteristic. The relationship, which does not include sensitive data, may be used, along with the second characteristic, as a proxy to validate the first characteristic. To use this relationship, the system may process different characteristics differently (e.g., generating a validation function that comprises a first validation process selected based on a first data characteristic and a second validation process selected based on a second data characteristic).

In some aspects, systems and methods are described herein for executing operations across data change repositories that comprise sensitive data in shared data resources. For example, the system may receive, from a first user, a first request to access a data change repository, wherein the data change repository comprises a plurality of records with a plurality of respective data labels, wherein each of the plurality of respective data labels comprises a first data characteristic and a second data characteristic, wherein the first data characteristic comprises a stateless value, and wherein the second data characteristic comprises a modification characteristic of the stateless value. The system may receive a second request to apply a first operation to records in the data change repository. The system may generate a masked version of the plurality of respective data labels, wherein the masked version of the plurality of respective data labels masks respective first data characteristics. The system may determine a first operation portion for performing the first operation on the first data characteristic and a second operation portion for performing the first operation on the second data characteristic. The system may perform, based on the first operation portion, the first operation to respective masked first data characteristics of the plurality of respective data labels. The system may perform, based on the second operation portion, the first operation to a respective second data characteristic of the plurality of respective data labels. The system may generate for display, on a user interface, a result for the first operation based on performing the first operation portion and the second operation portion, wherein the result comprises a masked first data characteristic.

In some aspects, systems and methods are described herein for validating sensitive data in shared data resources. For example, the system may receive, from a first user, a first request to access a data change repository, wherein the data change repository comprises a plurality of records with a plurality of respective data labels, wherein each of the plurality of respective data labels comprises a first data characteristic and a second data characteristic, wherein the first data characteristic comprises a stateless value, and wherein the second data characteristic comprises a modification characteristic of the stateless value. The system may receive, from the first user, a first validation request for a first record of the plurality of records. The system may determine a first validation function for validating the data change repository, wherein the first validation function comprises a first validation process selected based on the first data characteristic and a second validation process selected based on the second data characteristic. The system may perform a first validation of the first record by applying the first validation process to the first data characteristic. The system may perform a second validation of the first record by applying the second validation process to the second data characteristic. The system may generate for display, on a user interface, a result for the first validation request based on the first validation and the second validation.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Systems and methods are described for maintaining a common data resource that is shared by numerous entities. In particular, the systems and methods may provide identification and/or validation of data in the common data resource in order to detect inaccuracies, inconsistencies and/or redundancies of the data. Moreover, the systems and methods do so in a manner that does not affect, and functions despite, security protocols, access restrictions, and/or viewing rights. To do so, the system may utilize a data change repository that supplements existing data in a database by storing various data labels for each record.

Figure 1A:
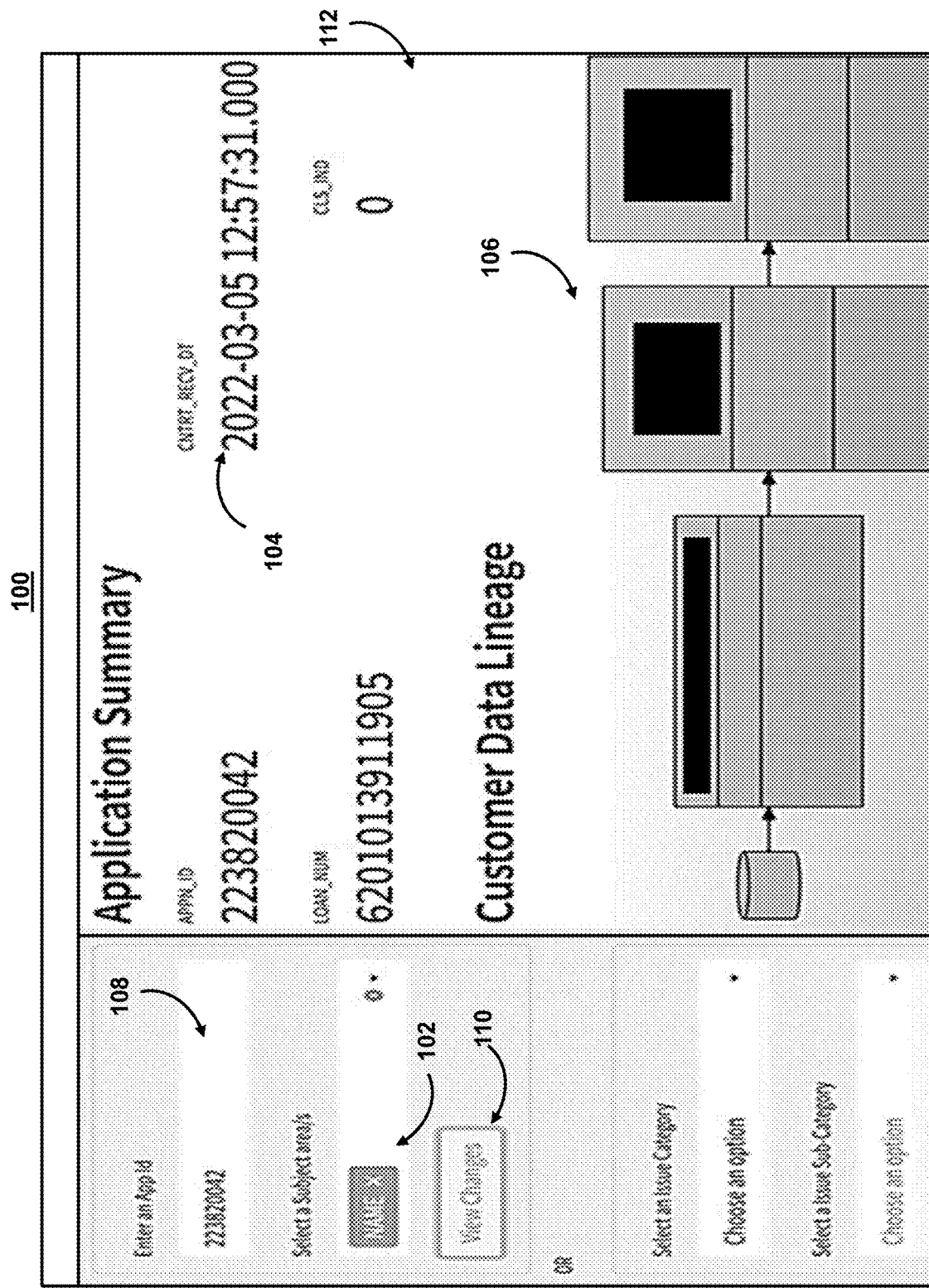
FIG. 1A shows an illustrative user interface for validating data in data change repositories, in accordance with one or more embodiments.
Figure 1B:
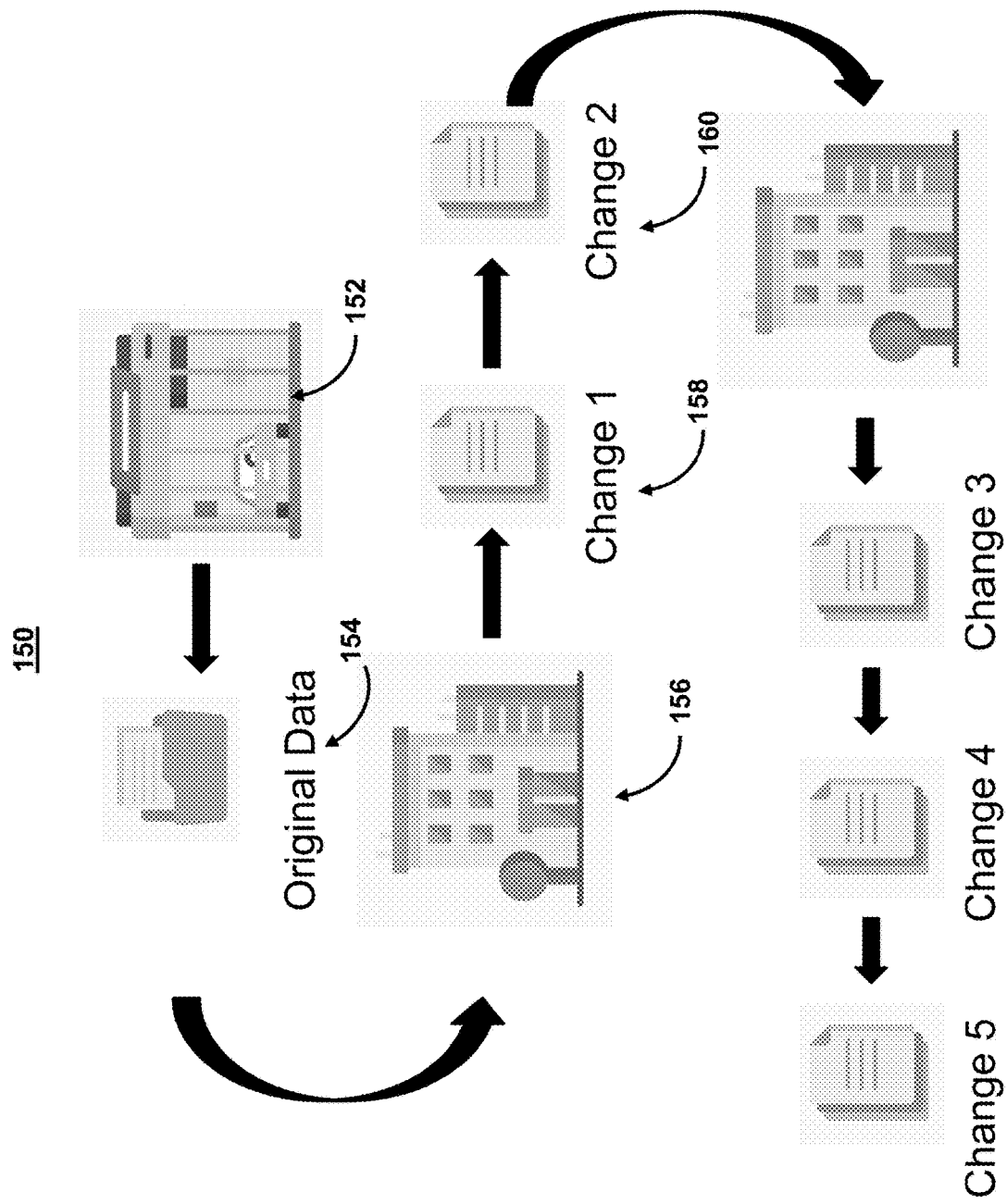
FIG. 1B shows an illustrative diagram for modifications of records in a common data resource, in accordance with one or more embodiments.

FIGS. 1A-B show a user interface for accessing a data change repository. FIG. 1A shows an illustrative user interface for validating data in data change repositories, in accordance with one or more embodiments. For example, the system may generate user interface 100 in response to a user request to access one or more data change repositories, such as a user selecting a data change repository icon in a software application, the user accessing a web page for one or more data change repositories, the user requesting access via a voice command, and/or other means for accessing the one or more data change repositories.

As referred to herein, a "user interface" may comprise a human-computer interaction and communication in a device, and may include display screens, keyboards, a mouse, and the appearance of a desktop. For example, a user interface may comprise a way a user interacts with an application or a website. As described herein, the application and/or website may comprise a data change repository system. The data change repository system may comprise a plurality of data change repository records.

User interface 100 may allow users to enter information about a data change repository system and/or data change repository records (e.g., via icon 102). For example, a data change repository record may include any data or content added to and/or accessed by the data change repository. As referred to herein, "content" should be understood to mean an electronically consumable user record, such as internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but also consumed and/or published by the user. The content may include one or more data change repository records and/or data related to the data change repository records such as data descriptions and/or characteristics.

A data change repository record may include and/or allow a user to perform operations on a record based on a characteristic. A characteristic may include any information that describes the record, such as a topic or category of the record, including information used to populate a characteristic for the record and/or otherwise describe a data structure and/or model structure for a data change repository record. For example, the characteristic may indicate how a record is indexed and/or archived in a connected graph data change repository database and/or data change repository system. For example, each data change repository record may correspond to content and/or a characteristic. For example, the characteristic may provide a characteristic that provides a fully semantic data model used to enable data entered into the system to be meaningfully applied across different data change repository application domain contexts (e.g., provide connections between different nodes of the connected graph data change repository database). In some embodiments, the system may include a custom characteristic, which may be a characteristic of a masked data. The custom characteristic may comprise relationship data as described herein.

As shown in FIG. 1A, the system is receiving a first request to perform a search based on a first characteristic (e.g., a "name"). In response, the system may generate a second characteristic of a record (e.g., based on the second characteristic matching and/or otherwise corresponding to the first characteristic). The second characteristic may comprise other information about the record. For example, user interface 100 is currently displaying file name 104 and change graph 106.

For example, in response to a given operation, the system may access a data change repository, wherein the data change repository comprises a plurality of records with a plurality of respective data labels. As described herein, a data label may comprise information about a given record. These data labels may include both stateful and/or stateless data (or metadata). For example, each data label comprises a first data characteristic comprising a stateless value and a second data characteristic comprises a modification characteristic of the stateless value. The systems and methods may then use these additional labels to identify and/or validate the underlying data. As the labels are used for the identification and/or validation (as opposed to the underlying data itself), the systems and methods do not affect, and function despite, security protocols, access restrictions, and/or viewing rights.

As referred to herein, stateless data (or a value thereof) may comprise data that does not change. For example, stateless data or a stateless value may comprise data that is not dynamically updated. That is, stateless data may comprise data that is stored without other dependencies that may result in the value of the stateless data to change. For example, a value of stateless data may comprise a name, address, and/or other information about a user, a system, an account, and/or other entity.

In some embodiments, stateless data may comprise any data in a data profile. As referred to herein, "a data profile" and/or "profile data" may comprise data actively and/or passively collected about a user, account, system, and/or other entity. For example, the profile data may comprise content generated by the user, account, system, and/or other entity. Profile data may also include a characteristic, which may include information about a user, account, system, and/or other entity and/or information included in a directory of stored settings, preferences, credentials, and information for the user, account, system, and/or other entity. For example, a profile for a user may have the settings for the user's installed programs and operating system. In some embodiments, the profile may be a visual display of personal data associated with a specific user, or a customized desktop environment. In some embodiments, the profile may be a digital representation of a person's identity, traits about the person, and/or other demographic information. In some embodiments, the data in the profile may be generated based on the system actively or passively monitoring the user.

User interface 100 includes input field 108 and may allow a user to filter through and identify data changes based on one or more characteristics related to a change in the data (e.g., modification characteristics). For example, via input field 108, the user can search for a particular application with associated details like name, Social Security number, address, etc. Additionally or alternatively, user interface 100 may identify data records or data labels upon which one or more operations should be executed. In some embodiments, user interface 100 may also include other user interface elements, such as additional text boxes, additional fields, additional input mechanisms, and other elements. Input field 108 receives input from a user, and the system receives the input from input field 108. The system may then use the received input as a search string. The system may receive a manual user input to input field 108, for example, by receiving a manual input from a user using a mouse and keyboard to select input field 108 and entering a text string into input field 108. In other embodiments, the system can populate input field 108 automatically, such as populating input field 108 with a search string in response to a user selecting a specific hyperlink or user interface element, in response to receiving a voice command from the user, or in response to receiving another form of automatic input to input field 108.

Input field 108 may be a selectable user interface element. When the system receives a selection to initiate the command string mechanism, the system may initiate a search of the data change repositories based on a received search string, such as a search string received by the system as input into input field 108. In some embodiments, input field 108 can be a manually selectable button or other similar user interface element. In some embodiments, the system may receive an automatic actuation of input field 108, such as detecting a user actuating a particular key on a keyboard, selecting input field 108 on a touch screen or other human-machine interface, in response to receiving a voice command from the user, and other suitable automatic actuation methods.

Icon 110 can be a manually selectable input mechanism, such as a button. The system may receive an actuation of the icon 110 and, in response, may generate for display a new user window or dialog box, a new view in user interface 100, a new tab in user interface 100, another suitable graphical user interface presentation element, and/or other result. The newly displayed graphical user interface presentation element (e.g., the result) can include additional fields or other user interface elements. The system may receive input from the user at the additional fields or other user interface elements and modify the search based on the received input, such as limiting the search to a particular data change repository or subsection of the data change repository, limiting the search to particular types of digital records, specifying specific business units or digital record authors to search, and other filters or refining factors.

User interface 100 may be displayed with returned results. For example, the system may perform a validation and receive, from the data change repository, a list of results matching a command string (e.g., entered via input field 108). The system may then provide the list of results as well as one or more instances of result 112 (e.g., indicating the status of a validation). In some embodiments, result 112 may display the most relevant results at the top of a list of returned results. In some embodiments, the system may receive a selection of one or more displayed results (e.g., may receive a manual selection in response to a user clicking on one of the displayed results). In response to receiving the selection of the one or more displayed results, the system may provide additional details about the selected one or more displayed results, such as record owner, one or more pieces of record functionality, record data, record type, and other additional details.

In some embodiments, user interface 100 may return a batch of results (e.g., data being validated in a batch). In some embodiments, the system may receive a plurality of content published to an application programming interface (API) based on the result. The system may then filter the plurality of content using a first user display setting for the first user. Additionally or alternatively, the system may determine, based on a filtering criterion, a respective authorization requirement for a plurality of content related to the result. The system may then compare the respective authorization requirement to a respective threshold authorization requirement to determine whether to publish the content.

In some embodiments, result 112 may comprise a notification and/or a recommendation. For example, the system may provide numerous types of notifications and/or recommendations as described herein. In some embodiments, user interface 100 (or the recommendation data therein) may be presented as a status page. The status page may include summary information about a data change repository system, data change repository record, comparison data, relationship data, and recommendation data as well as issues, stakeholders, responsible contributors, etc. The status page may also include queries that may be performed as well as information about a rule, operations, and/or other validation characteristics.

In some embodiments, when the system receives a user request to access user interface 100, the system may access the user's credentials from a user profile associated with the user. For example, when the system receives a request from the user to access user interface 100, the system accesses the profile of the user stored in a data storage location to obtain credentials associated with the user. Credentials associated with the user may include a username, a user role, a user business unit, a list of user team memberships, a user organization, a search history associated with the user, and other similar credentials.

The system may generate results 112 and/or otherwise perform an operation based on modification characteristics for data in the data repository. The system and/or a data label may also comprise a modification characteristic of the stateless value. As described herein, a "modification characteristic" may comprise any information related to a modification of a stateless value. For example, a modification characteristic may comprise information about what, where, who, when, and/or how a stateless value was changed.

The system may use these data labels to uniquely process different characteristics of the data in order to search, validate, and/or mask data. For example, the system may perform validations and/or other operations on the data labels while masking sensitive data from both use by the system and/or display to a user. For example, the system may intentionally mask in black data that is determined to be sensitive. While data is masked, the users can search a particular issue category like address and sub-category, search categories within a specific time period, retrieve a list of applications that fall under the selected scenario, and/or validate the data that was corrected as a result of data accuracy control trigger.

This system may perform these validations and/or other operations despite masking sensitive data as the system may preserve a relationship between the first characteristic and second characteristic. The relationship, which does not include sensitive data, may be used along with the second characteristic as a proxy to validate the first characteristic. To use this relationship, the system may process different characteristics differently (e.g., generating a validation function that comprises a first validation process selected based on a first data characteristic and a second validation process selected based on a second data characteristic).

FIG. 1B shows an illustrative diagram for modifications of records in a common data resource in order to aid users in understanding data changes, in accordance with one or more embodiments. Diagram 150 may appear as a graphic in a user interface (e.g., graph 106 (FIG. 1A)). Diagram 150 may track changes (e.g., modification characteristics) of a given stateless value. Diagram 150 may visually represent the what, where, who, when, and/or how of a data change.

A modification characteristic may include any information that describes a change to a record, data label, and/or stateless value. For example, the modification characteristic may indicate how a record is indexed and/or archived in a connected graph data change repository database and/or data change repository system. For example, each data change repository record may correspond to content and/or other characteristics. For example, based on the modification characteristics corresponding to each stateless value (or change thereto) the system may provide a fully semantic data model used to enable data entered into the system to be meaningfully applied across different data change repository application domain contexts (e.g., provide connections between different nodes of the connected graph data change repository database). In some embodiments, the system may include a custom characteristic, which may be a characteristic of a masked data. The custom characteristic may comprise relationship data as described herein.

The data change repository system may arrange and/or organize the data change repository records into a graph-based hierarchy (e.g., diagram 150). For example, the system may organize the various data change repository records into a system in which data change repository records are organized one above the other according to one or more changes. The hierarchy may comprise a plurality of data change repository records arranged in series and/or in parallel in which the inputs and outputs are intertwined such that information from one or more data change repository records may be received from, and/or used by, one or more other data change repository records.

Each data change repository record may comprise content such as software applications, instructions, and/or other information used by a data change repository system. Each data change repository record may also include a characteristic and/or other characteristics about a record that describes the data change repository records and/or portions of the data change repository records. In some embodiments, the characteristic may include information populated in a data structure and/or model structure as described herein, as well as the input and/or outputs that are processed by a data change repository system and/or one or more data change repository records. For example, the characteristic may represent a fully semantic data model used to enable data entered into the system to be meaningfully applied across different data change repository application domain contexts.

For example, as shown in diagram 150, the system may receive original data 154 from application 152. Diagram 150 may then show the various changes to original data 154 that occurred by one or more other applications, systems, and/or users. For example, as shown in diagram 150, original data 154 is changed twice (e.g., instance 158 and instance 160) at application 156. The stateless value is then changed three more times by another application.

In some embodiments, the system may use the content such as record characteristics (e.g., ontologies, metadata, data descriptions, and/or values associated with a category of a characteristic) to organize data change repository records into the hierarchy. The hierarchy may comprise a connected graph data change repository database as described herein. The data change repository may comprise a complex structured and/or unstructured set of information used by a computer system to enable a data change repository system. While embodiments are described herein with respect to a connected graph data change repository database, these embodiments may alternatively or additionally use a hierarchical or relational database structure to link different content (e.g., data change repository records) within the data change repository system. For example, a hierarchical database structure may be a structure in which data is organized into a tree-like structure. For example, the data may be stored as records that are connected to one another through links. A record may be a collection of fields, with each field containing only one value (e.g., content). The type of a record may define which fields the record contains. In some embodiments, the tree structure may comprise a node-link structure in which a parent node links to child nodes, nested sets (e.g., in relational databases), radial trees, and/or other organizational systems.

In some embodiments, a modification characteristic may include data about a relationship between two characteristics. The relationship data may map a first characteristic to the second characteristic. For example, relationship data may comprise a pointer, link, and/or other database cross-reference information. For example, the system may use relationship data to define how first value keywords are mapped, how the second characteristic keywords are defined, and/or how first values are mapped to second characteristics. That is, the relationship data may be used to map relationships (e.g., edges in a graph database) between data, data entity characteristics, and/or other characteristics of the data. For example, in some embodiments, the relationship data may comprise an edge (or data defining the edge) in a connected graph data change repository database. The relationship data may further include data that connects (or links, points to, etc.) a third node corresponding to a first value and a fourth node corresponding to a second characteristic. The relationship data may then be used to generate a characteristic for use in executing operations on a masked version of the plurality of respective data labels.

As opposed to a simple tag annotated to an existing data, the generation of the masked data (e.g., populated with relationship data indicating relationships between different characteristics) allows for searches and queries to be run directly on the masked data.

For example, the relationship data may define the link between a given characteristic in user profile data and the one or more applications, software profiles, etc., within the data change repository. Furthermore, as opposed to conventional tags, the relationship data may include descriptions of both the characteristics (e.g., stateless values and/or modification characteristics) as well as the code defining the relationship and/or providing the linking mechanism. For example, the relationship data may include an identifier for the profile, the profile data type, the code required for defining the relationship, an identifier for the existing record, an application type, a characteristic type, etc. The system may thus run searches and queries on this data, which would not exist in conventional systems, and which preserves privacy, security, etc., of the data.

Each data change repository record may comprise a component of the data change repository. For example, "components" of a data change repository may include portions of the data change repository (e.g., corresponding to one or more nodes of the connected graph data change repository database) that provide modeling for a specific domain application, address specific records, provide a specific function, and/or are otherwise distinct from other portions of the data change repository. The components may be used to distinguish between standardized and non-stateless values, data descriptions, etc. The various components of a record, data change repository, command string, etc., may be based on corresponding relationship data.

In some embodiments, the system may process one or more command strings. A command string may comprise one or more alphanumeric characters that cause one or more operations to be performed. For example, a command string may cause functionality such as searching an exchange, validating a record, and/or other functionality (e.g., automatically updating metadata, records, and/or configurations). In some embodiments, a command string may be any input that triggers an operation or command. Operations and commands can be configured for execution on a record type based on the stateless data and modification characteristics. For example, changes to the owner information of a record instance, if valid based on the rules configured for the record type, may result in changes to role assignments in the Role-based Access Control (RBAC) system (which authorizes changes to record information) and may also result in the owner information updated in the search index. With these changes, the replaced/previous owner would lose access to make changes to the record, the new owner will have the necessary access to make changes, and record information can be searched based on the new owner. In some embodiments, the system may automatically generate a command string in response to a modification of a record, characteristic, and/or other information.

In some embodiments, commands and operations may include: publishing record information to a data store to generate analytics; generating a notification, e.g., when a particular characteristic in an record instance meets certain criteria; indexing a new (or edited) record instance or characteristic change in a search index and rendering a search experience or record management dashboard including the new (or edited) record instance; provisioning users and systems to roles on a record instance based on an RBAC policy specifying roles and permissions for the record type; generating a webhook or streaming an event for another system that needs to learn about or act on record metadata (e.g., act on creation or editing a record instance); logging an event to retain historical insights into record activity, e.g., which user/system created a record instance or edited certain metadata; indexing (e.g., in a graph) record relationships based on relationship metadata added to an record instance (e.g., a user follows a vehicle listing); triggering a workflow for an record instance based on an characteristic added, e.g., triggering a review process if unusual information is detected.

For example, in some embodiments, the system may perform validations and/or other data operations upon one or more of the records. These validation functions may comprise a first validation process that is generated using a standardized validation process (e.g., corresponding to a stateless value) and a second validation process that is generated using a validation process selected based on a non-stateless value that is specific to a respective record type of the plurality of respective data labels. By doing so, these validation functions allow validation of records in the exchange that may have both standardized and custom schemas. In such cases, each portion may be based on a component of the data change repository.

As part of a record type's configuration, each record type defines the metadata or schema for each record instance belonging to that record type. As an example, for a digital record type modeling a vehicle, metadata may include the make and model of the vehicle, the owner of the vehicle, and other types of characteristics.

Validation functions are also set up as part of a record type's configuration, and they may differ for each record type. Validation functions are helpful to ensure that the record characteristics are, for example, in the expected format and accurate so a variety of use cases such as dashboards, integrations with other applications, reports, etc., can rely on the metadata in a record instance.

For example, validation functions are defined to verify that the characteristics are in the correct data type and format, all the mandatory characteristics are present, and each characteristic meets certain data quality rules (e.g., the state field in an address must be a valid state). Rules can also be customized to identify the characteristics that are required only at a specific stage of the record's life cycle; to indicate identifiers/references that need to be validated with a different system of record/API (e.g., a user's identifier should point to a valid user in the system of record for registered users). One or more validation functions can be associated with each characteristic or a group of related characteristics; the rule can be a predefined one (e.g., address fields must be in a valid format and a valid address) or a custom one. Validation functions may also be derived and updated automatically based on an available sample of values.

At runtime, when a modification characteristic may be created or updated, the platform will execute the validations based on the record type and the characteristics present in the request to verify the provided record information.

For example, the system may determine a first validation process that is generated using a standardized process (e.g., corresponding to a component featuring a stateless value) and a second operation portion that is generated using a process selected based on a non-stateless value that is specific to a respective record type of the plurality of respective data labels (e.g., corresponding to a component featuring a non-stateless value). By doing so, these command strings allow for commands to be executed across records in the exchange that may have both standardized and custom schemas.

Figure 2A:
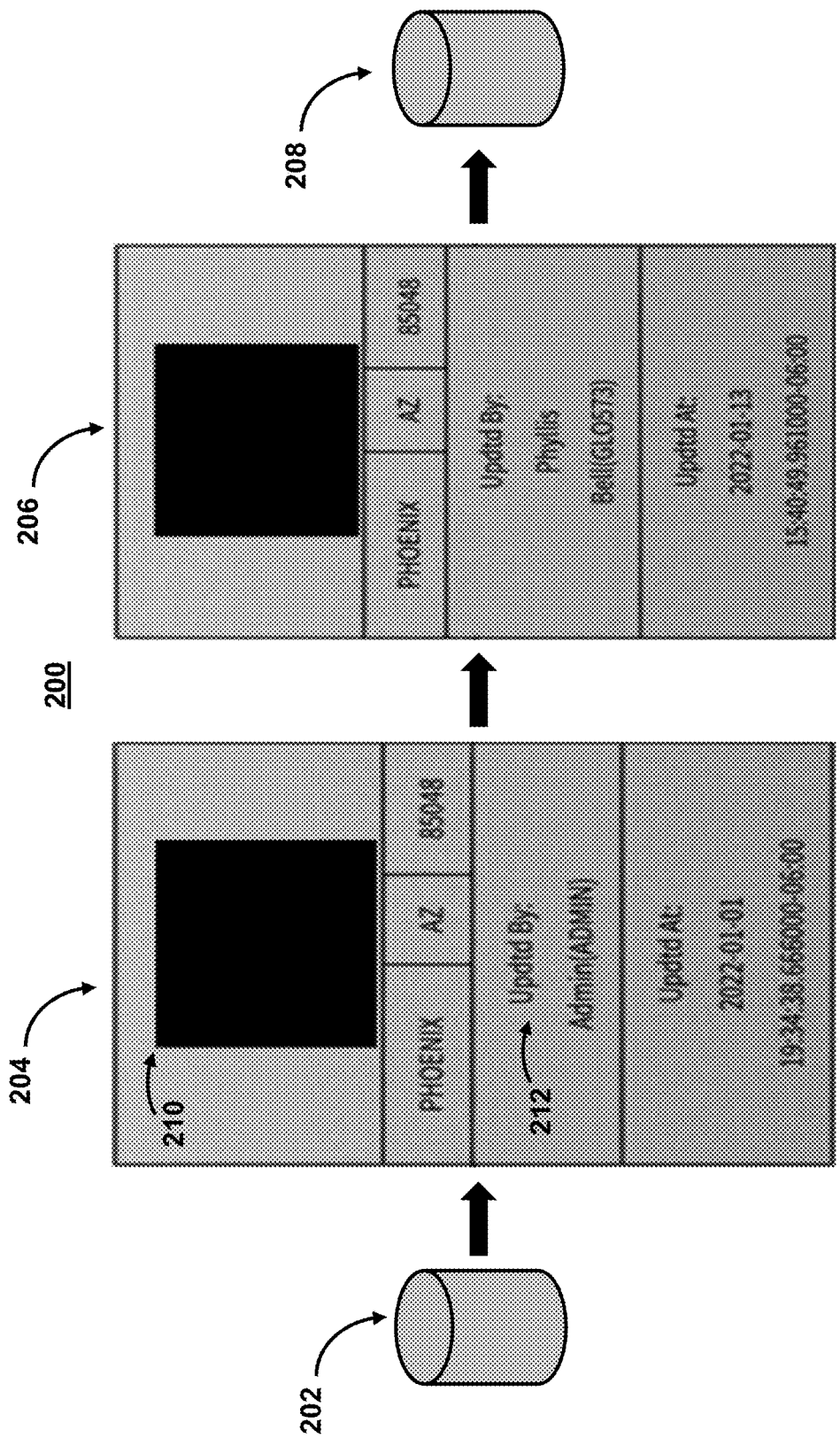
FIG. 2A shows illustrative architecture for a data change repository with a plurality of respective data labels, in accordance with one or more embodiments.

FIG. 2A shows illustrative architecture for a data change repository with a plurality of respective data labels, in accordance with one or more embodiments. For example, for the system data labels for different characteristics of a record, the system may use these data labels to uniquely process different characteristics of the data in order to search, validate, and/or mask data. For example, the system may perform validations and/or other operations on the data labels while masking sensitive data from both use by the system and/or display to a user. This system may perform these validations and/or other operations despite masking sensitive data as the system may preserve a relationship between the first characteristic and second characteristic. The relationship, which does not include sensitive data, may be used, along with the second characteristic, as a proxy to validate the first characteristic. To use this relationship, the system may process different characteristics differently (e.g., generating a validation function that comprises a first validation process selected based on a first data characteristic and a second validation process selected based on a second data characteristic).

As shown in FIG. 2A, record 200 is currently being shared by first data source 202 and second data source 208. Moreover, record 200 may comprise an instance of a modification of record 200. For example, record 200 includes a first set of data labels 204 and a second set of data labels 206. Each of these data labels comprises a first data characteristic (e.g., data characteristic 210) and a second data characteristic (e.g., data characteristic 212), wherein the first data characteristic comprises a stateless value, and wherein the second data characteristic comprises a modification characteristic of the stateless value.

As shown in FIG. 2A, data characteristic 210 is masked. Data masking or data obfuscation is the process of modifying sensitive data in such a way that it is of no or little value to unauthorized intruders while still being usable by software or authorized personnel. Data masking can also be referred to as anonymization, or tokenization, depending on different contexts. By doing so, the system may prevent data from being accessed, either by a manual or automated system, in an unauthorized manner. For example, each set of data labels (e.g., the first set of data labels 204 and the second set of data labels 206) may maintain a relationship between the stateless value (e.g., data characteristic 210) that is masked and the modification characteristic (e.g., data characteristic 212). The relationship, which does not include sensitive data, may be used, along with the second characteristic, as a proxy to validate the first characteristic. To use this relationship, the system may process different characteristics differently (e.g., generating a validation function that comprises a first validation process selected based on a first data characteristic and a second validation process selected based on a second data characteristic).

For example, the system may validate stateless data (e.g., data characteristic 210) based on whether or not the modification characteristic (e.g., data characteristic 212) corresponds to a user, application, and/or other entity with a required level of authorization to modify the specific stateless data (e.g., data characteristic 210) in the first set of data labels 204. For example, the system may determine whether or not a user corresponding to the value of the modification characteristic (e.g., data characteristic 212) has a required level of access.

In another example, the system may validate the stateless data (e.g., data characteristic 210) based on whether or not the modification characteristic (e.g., data characteristic 212) corresponds to an approved format. For example, the modification characteristic (e.g., data characteristic 212) may indicate a length, presence of a keyword, etc.

Figure 2B:
FIG. 2B shows illustrative tables of records to be validated, in accordance with one or more embodiments.
Figure 2B:
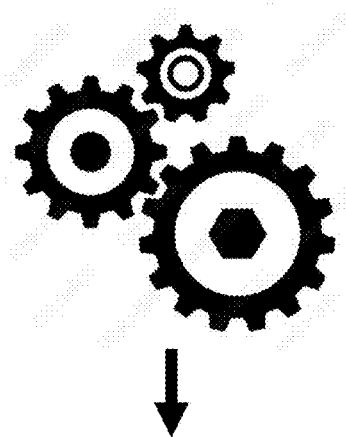
Figure 2B:

FIG. 2B shows illustrative tables of records to be validated, in accordance with one or more embodiments. For example, table 252 may correspond to a list of addresses that need to be validated. The address may constitute stateless data that may be masked. In order to process this data, the system may retrieve modification data (e.g., data characteristic 212 (FIG. 2A)) that indicates formatting, length, required characters, and/or specific values (e.g., a known street address).

As shown in FIG. 2B, the system may compare the modification characteristic to requirements for modifications to determine whether or not to modify the data. For example, the modification data may include requirement for formatting (e.g., secondary addresses), length (e.g., eliminating abbreviations), required characters (e.g., a known state or ZIP Code), and/or specific values (e.g., a known street address). The system may then generate a result (e.g., table 254) that may or may not validate the data.

Figure 2C:
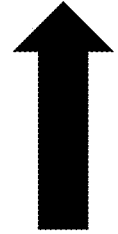
FIG. 2C shows illustrative sources for data labels in data change repository for a common data source, in accordance with one or more embodiments.

FIG. 2C shows illustrative sources for data labels in a data change repository for a common data source, in accordance with one or more embodiments. FIG. 2C may comprise data label 270. Data label 270 may comprise first characteristic 272 and second characteristic 274. For example, to retrieve and/or process characteristics the system may pull data from a plurality of tables and/or other data sources. For example, to generate first characteristic 272, the system may parse a plurality of data tables and/or compare different instances of data for potential matches. The system may also look for particular data table operations (e.g., database operations that indicate write operations) that indicate data was changed. Additionally or alternatively, the system may parse lines of code to identify metadata used to determine one or more modification characteristics. By doing so, the system may keep track of the ever-changing data with accuracy and consistency.

Figure 3:
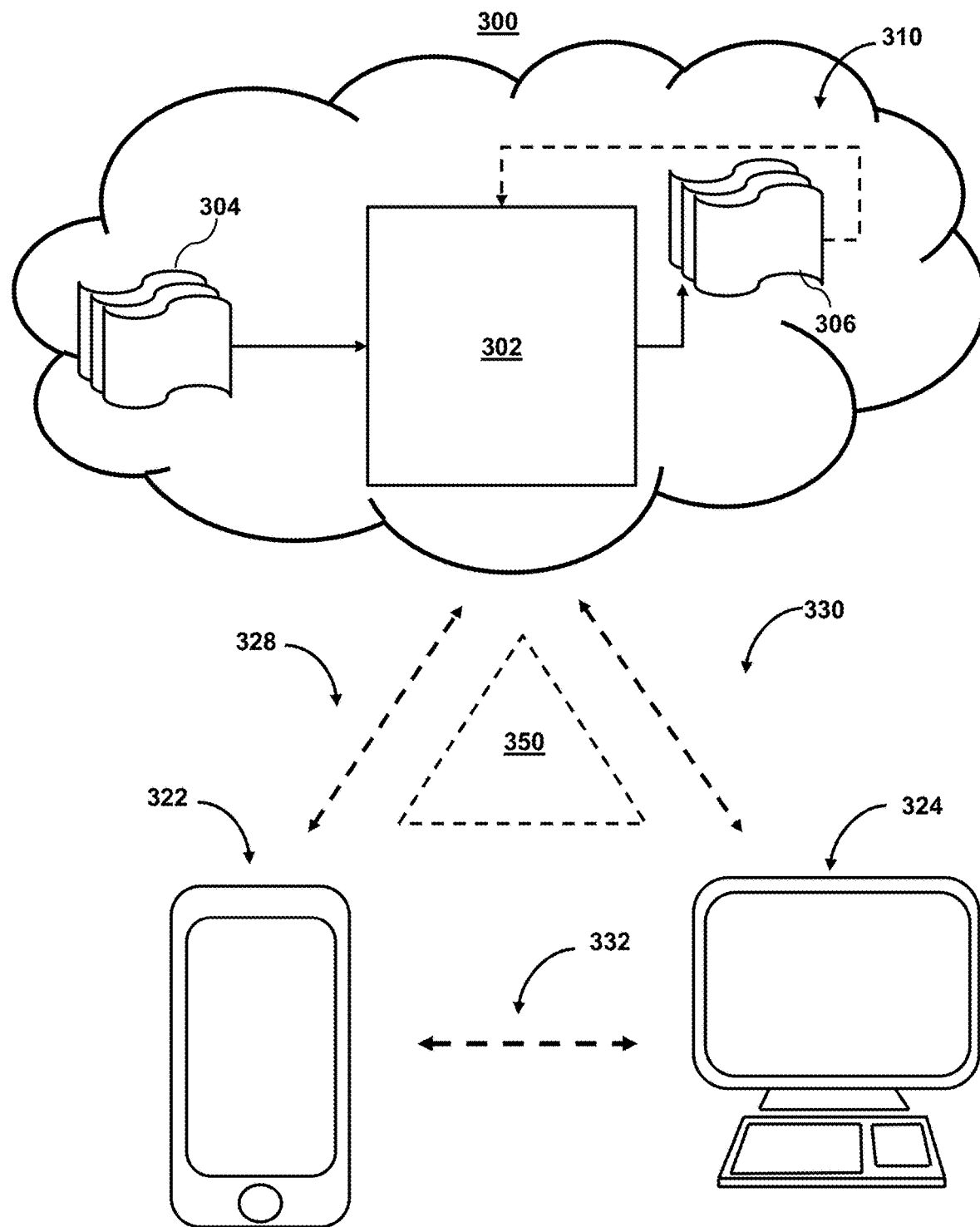
FIG. 3 shows illustrative system components for a data change repository, in accordance with one or more embodiments.

FIG. 3 shows illustrative components for a system used to execute operations across data change repositories that comprise sensitive data in shared data resources in accordance with one or more embodiments. For example, FIG. 3 may show illustrative components for executing operations. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as a touchscreen smartphone and a personal computer, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., an operation portion, a validation result, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., an operation portion, a validation result, etc.).

In some embodiments, the model (e.g., model 302) may automatically perform actions based on outputs 306. In some embodiments, the model (e.g., model 302) may not perform any actions. In some embodiments, the first operation portion may be based on an output of a model used for predicting one or more operation terms and/or the model is updated based on the result.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
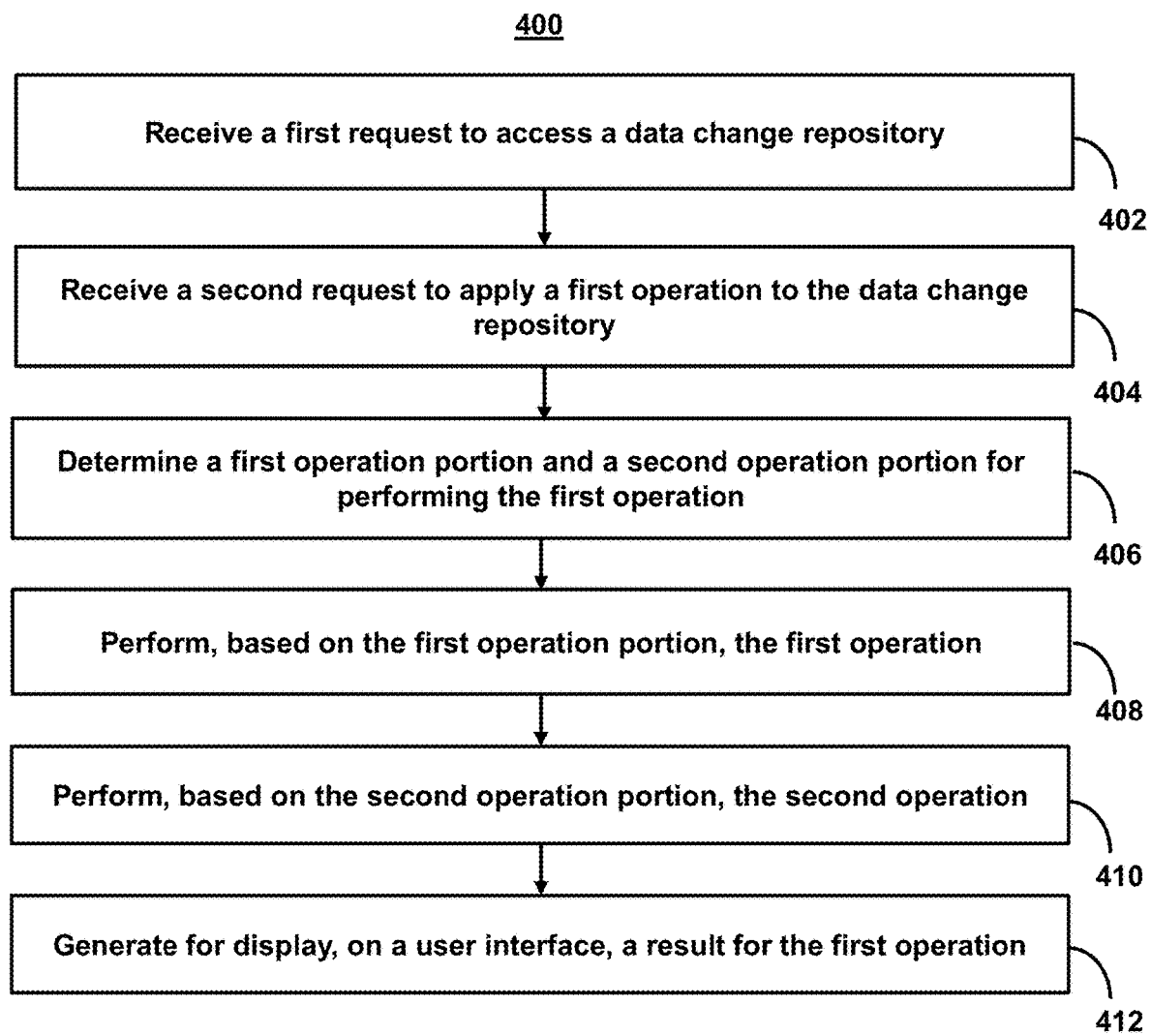
FIG. 4 shows a flowchart of the steps involved in dynamically generated validation functions, in accordance with one or more embodiments.

FIG. 4 shows a flowchart of the steps involved in executing operations across data change repositories that comprise sensitive data in shared data resources, in accordance with one or more embodiments. For example, the system may use process 400 (e.g., as implemented on one or more system components described above) in order to validate data in one or more data change repositories for relevant digital records such as data change repositories comprising information on digital records with non-homogenous functionality and non-standardized data descriptions. Each of the records may comprise a plurality of respective data labels, each of the plurality of respective data labels comprising a first data characteristic and a second data characteristic. The first data characteristic comprises a stateless value shared by all data labels, and the second data characteristic comprises a schema specific to a respective record type of the plurality of respective data labels.

At step 402, process 400 (e.g., using one or more components described above) receives a first request to access a data change repository. For example, the system may receive, from a first user, a first request to access a data change repository, wherein the data change repository comprises a plurality of records with a plurality of respective data labels, wherein each of the plurality of respective data labels comprises a first data characteristic and a second data characteristic, wherein the first data characteristic comprises a stateless value, and wherein the second data characteristic comprises a modification characteristic of the stateless value.

In some embodiments, the request may include additional validation parameters for validating the data change repository and may include a user identity, a user credential, a type of record to search, a particular data change repository record to validate, or other parameters. For example, in some embodiments, the system may determine a first authorization level for the first user and compare the first authorization level to a database listing authorization levels corresponding to each of a plurality of operation types to determine whether to perform the first operation. In another example, the system may determine a first authorization level corresponding to the modification characteristic and compare the first authorization level to a database listing authorization levels corresponding to modification characteristics to validate the plurality of respective data labels based on the first authorization level. In yet another example, the system may determine, based on the modification characteristic, a first role of a second user that previously modified the stateless value and compare the first role to a database listing roles authorized to modified stateless values to validate the plurality of respective data labels based on the first role. In some embodiments, the system accesses the user profile based on a credential associated with a requesting user or based on an identity of the requesting user. The system uses the received credential or identity to access a profile stored in memory associated with the user. Process 400 may then access one or more credentials associated with the user, such as a username, a user business unit, a user team, or another suitable credential.

At step 404, process 400 (e.g., using one or more components described above) receives a second request to apply a first operation to the data change repository. For example, the system may receive a second request to apply a first operation to the plurality of records in the data change repository.

In some embodiments, process 400 (e.g., using one or more components described above) may generate a masked version of records in the data change repository. For example, the system may generate a masked version of the plurality of respective data labels, wherein the masked version of the plurality of respective data labels masks respective first data characteristics.

At step 406, process 400 (e.g., using one or more components described above) determines a first operation portion and a second operation portion for performing the first operation. For example, the system may determine a first operation portion for performing the first operation on the first data characteristic and a second operation portion for performing the first operation on the second data characteristic.

In some embodiments, determining the first operation portion comprises the system determining a respective record type identifier for each of the plurality of respective data labels and inputting the respective record type identifier into a database listing schemas corresponding to record type identifiers to determine a respective set of database objects for each of the plurality of respective data labels. The system may then compare the record terminology identifier to a database listing terminology for users performing the first operation to determine a modification to the second operation portion. The system may then apply the modification to the second operation portion prior to performing the first operation to the respective second data characteristic of the records.

In some embodiments, determining the first operation portion further comprises the system determining a relationship between the first data characteristic and the second data characteristic and generating the first operation portion based on the relationship.

In some embodiments, determining the second operation portion comprises the system determining a modification to the second operation portion based on the respective set of database objects and applying the modification to the second operation portion prior to performing the first operation to the respective second data characteristic of the records.

In some embodiments, the first operation portion is further determined based on an output of a model used for predicting one or more operation terms, and wherein the model is updated based on the result.

In some embodiments, determining the second operation portion comprises the system determining a record terminology identifier based on the first operation, comparing the record terminology identifier to a database listing terminology for users performing the first operation to determine a modification to the second operation portion, and applying the modification to the second operation portion prior to performing the first operation to the respective second data characteristic of the records.

In some embodiments, determining the first operation portion further comprises the system determining a first value set identifier based on the second data characteristic and comparing the first value set identifier to a database listing characteristic sets corresponding to the first value set identifier to generate the first operation portion.

At step 408, process 400 (e.g., using one or more components described above) performs, based on the first operation portion, the first operation. For example, the system may perform, based on the first operation portion, the first operation to respective masked first data characteristics of the plurality of respective data labels.

At step 410, process 400 (e.g., using one or more components described above) performs, based on the second operation portion, the second operation. For example, the system may perform, based on the second operation portion, the first operation to a respective second data characteristic of the plurality of respective data labels.

In some embodiments, performing, based on the second operation portion, the first operation to the respective second data characteristic of the records further comprises the system selecting a first algorithm based on a first schema of the first data characteristic and the first operation and processing each of the respective first data characteristics for the plurality of respective data labels using the first algorithm.

At step 412, process 400 (e.g., using one or more components described above) generates for display, on a user interface, a result for the first operation. For example, the system may generate for display, on a user interface, a result for the first operation based on performing the first operation portion and the second operation portion, wherein the result comprises a masked first data characteristic.

In some embodiments, generating for display, on the user interface, the result for the first operation further comprises the system determining, based on a first user, a respective authorization requirement for a plurality of content related to the result and comparing the respective authorization requirement to a respective threshold authorization requirement to determine whether to publish the plurality of content.

In some embodiments, generating for display, on the user interface, the result for the first operation comprises the system receiving a plurality of content published to an API based on the result and filtering the plurality of content using a first user display setting for the first user. In some embodiments, the system may receive a plurality of content published to an API based on the result. The system may then filter the plurality of content using a first user display setting for the first user. Additionally or alternatively, the system may determine, based on a filtering criterion, a respective authorization requirement for a plurality of content related to the result. The system may then compare the respective authorization requirement to a respective threshold authorization requirement to determine whether to publish the content.

In some embodiments, generating for display, on the user interface, the result for the first operation further comprises the system determining, based on a first user, a respective authorization requirement for a plurality of content related to the result and comparing the respective authorization requirement to a respective threshold authorization requirement to determine whether to publish the plurality of content.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
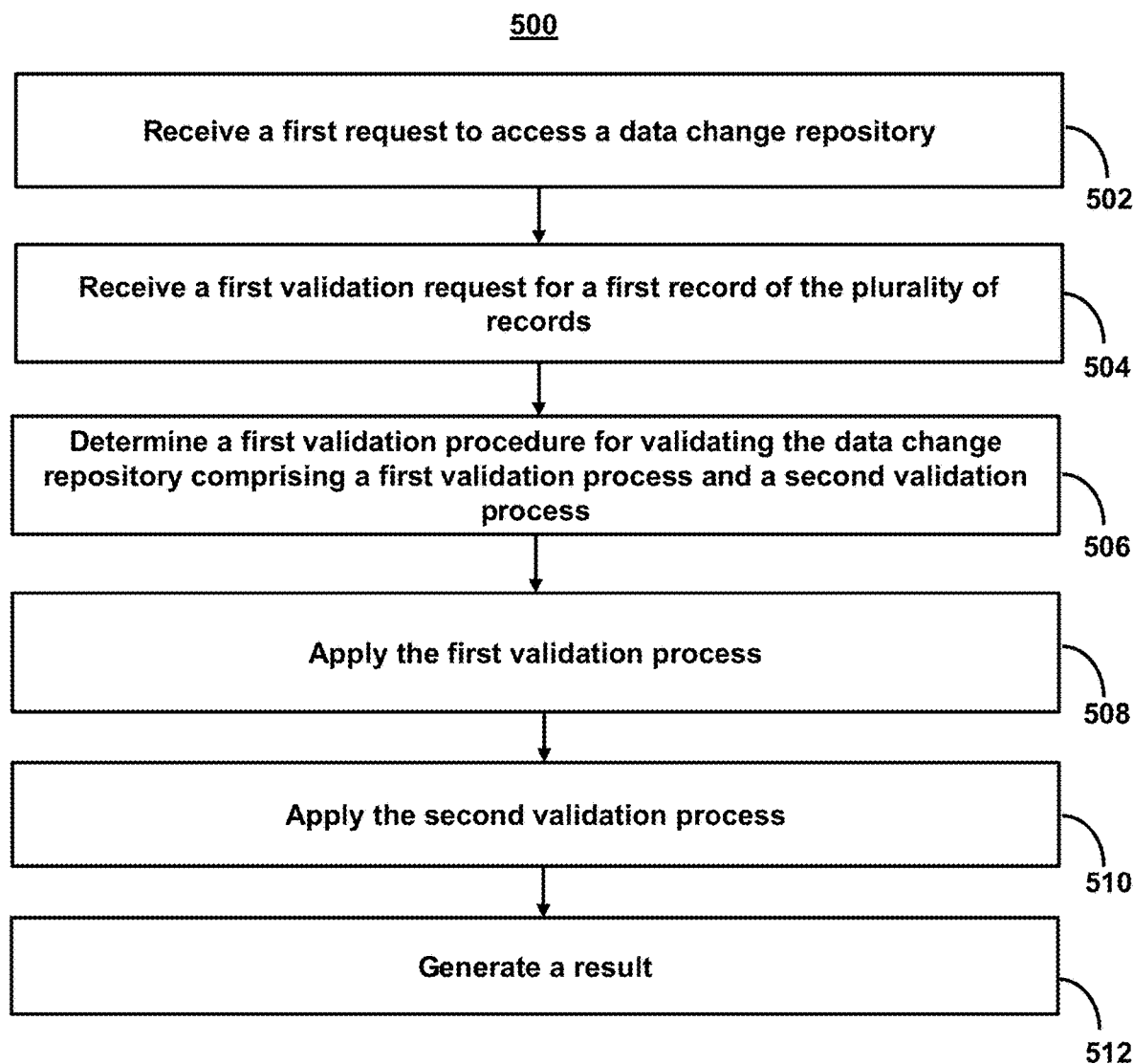
FIG. 5 shows a flowchart of the steps involved in executing operations across data change repositories, in accordance with one or more embodiments.

FIG. 5 shows a flowchart of the steps involved in validating sensitive data in shared data resources, in accordance with one or more embodiments. For example, the system may use process 500 (e.g., as implemented on one or more system components described above) in order to validate sensitive data.

At step 502, process 500 (e.g., using one or more components described above) receives a first request to access a data change repository. For example, the system may receive, from a first user, a first request to access a data change repository, wherein the data change repository comprises a plurality of records with a plurality of respective data labels, wherein each of the plurality of respective data labels comprises a first data characteristic and a second data characteristic, wherein the first data characteristic comprises a stateless value, and wherein the second data characteristic comprises a modification characteristic of the stateless value.

In some embodiments, the system may determine a first authorization level corresponding to the modification characteristic and compare the first authorization level to a database listing authorization levels corresponding to modification characteristics to validate the plurality of respective data labels based on the first authorization level. For example, the system may determine, based on the modification characteristic, a first role of a second user that previously modified the stateless value and compare the first role to a database listing roles authorized to modified stateless values to validate the plurality of respective data labels based on the first role.

In some embodiments, the system may determine a first value set identifier based on the second data characteristic and compare the first value set identifier to a database listing characteristic sets corresponding to the first value set identifier to determine the first data characteristic for performing the first validation.

At step 504, process 500 (e.g., using one or more components described above) receives a first validation request for a first record of the plurality of records. For example, the system may receive, from the first user, a first validation request for a first record of the plurality of records.

At step 506, process 500 (e.g., using one or more components described above) determines a first validation function for validating the data change repository comprising a first validation process and a second validation process. For example, the system may determine a first validation function for validating the data change repository, wherein the first validation function comprises a first validation process selected based on the first data characteristic and a second validation process selected based on the second data characteristic.

In some embodiments, the system may determine the first validation function for validating the data change repository. For example, the system may determine a relationship between the first data characteristic and the second data characteristic and select the first validation process based on the relationship.

At step 508, process 500 (e.g., using one or more components described above) applies the first validation process. For example, the system may perform a first validation of the first record by applying the first validation process to the first data characteristic.

In some embodiments, performing a first validation of the first record by applying the first validation process to the first data characteristic further comprises the system selecting a first validation algorithm based on a first schema of the first data characteristic and processing each respective first data characteristic for the plurality of respective data labels using the first validation algorithm.

In some embodiments, performing the first validation of the first record by applying the first validation process to the first data characteristic comprises the system generating a masked version of the plurality of respective data labels, wherein the masked version of the plurality of respective data labels masks respective first data characteristics and applying the first validation process to a masked first data characteristic. For example, the system may generate a masked version of each of the plurality of respective data labels, wherein the masked version of each respective data label masks respective first data characteristics.

In some embodiments, the first validation function is further determined based on an output of a model used for predicting one or more validation functions, and wherein the model is updated based on the result.

At step 510, process 500 (e.g., using one or more components described above) applies the second validation process. For example, the system may perform a second validation of the first record by applying the second validation process to the second data characteristic.

In some embodiments, performing the second validation of the first record by applying the second validation process to the second data characteristic further comprises the system determining a respective record type identifier for each of the plurality of respective data labels and inputting the respective record type identifier into a database listing schemas corresponding to record type identifiers to determine a respective set of database objects for each of the plurality of respective data labels.

In some embodiments, performing the second validation of the first record by applying the second validation process to the second data characteristic further comprises the system determining a modification to the second validation process based on the respective set of database objects and applying the modification to the second validation process.

In some embodiments, performing the second validation of the first record by applying the second validation process to the second data characteristic further comprises the system determining a record terminology identifier based on the second data characteristic, comparing the record terminology identifier to a database listing terminology for records with the second data characteristic to determine a modification to the second validation process, and applying the modification to the second validation process.

At step 512, process 500 (e.g., using one or more components described above) generates a result. For example, the system may generate for display, on a user interface, a result for the first validation request based on the first validation and the second validation.

In some embodiments, generating for display, on the user interface, the result for the first validation request comprises the system receiving a plurality of content published to an API based on the result and filtering the plurality of content using a first user display setting for the first user.

In some embodiments, generating for display, on the user interface, the result for the first validation request further comprises the system determining, based on a first user, a respective authorization requirement for a plurality of content related to the result and comparing the respective authorization requirement to a respective threshold authorization requirement to determine whether to publish the plurality of content.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for executing operations across data change repositories that comprise sensitive data in shared data resources.
2. A method for validating sensitive data in shared data resources.
3. The method of any one of the preceding embodiments, further comprising: receiving, from a first user, a first request to access a data change repository, wherein the data change repository comprises a plurality of records with a plurality of respective data labels, wherein each of the plurality of respective data labels comprises a first data characteristic and a second data characteristic, wherein the first data characteristic comprises a stateless value, and wherein the second data characteristic comprises a modification characteristic of the stateless value; receiving a second request to apply a first operation to records in the data change repository; generating a masked version of the plurality of respective data labels, wherein the masked version of the plurality of respective data labels masks respective first data characteristics; determining a first operation portion for performing the first operation on the first data characteristic and a second operation portion for performing the first operation on the second data characteristic; performing, based on the first operation portion, the first operation to respective masked first data characteristics of the plurality of respective data labels; performing, based on the second operation portion, the first operation to respective second data characteristic of the plurality of respective data labels; and generating for display, on a user interface, a result for the first operation based on performing the first operation portion and the second operation portion, wherein the result comprises a masked first data characteristic.
4. The method of any one of the preceding embodiments, wherein performing, based on the second operation portion, the first operation to the respective second data characteristic of the records further comprises: selecting a first algorithm based on a first schema of the first data characteristic and the first operation; and processing each of the respective first data characteristics for the plurality of respective data labels using the first algorithm.
5. The method of any one of the preceding embodiments, wherein generating for display, on the user interface, the result for the first operation further comprises: determining, based on a first user, a respective authorization requirement for a plurality of content related to the result; and comparing the respective authorization requirement to a respective threshold authorization requirement to determine whether to publish the plurality of content.
6. The method of any one of the preceding embodiments, wherein determining the first operation portion comprises: determining a respective record type identifier for each of the plurality of respective data labels; and inputting the respective record type identifier into a database listing schemas corresponding to record type identifiers to determine a respective set of database objects for each of the plurality of respective data labels.
7. The method of any one of the preceding embodiments, wherein determining the second operation portion comprises: determining a modification to the second operation portion based on the respective set of database objects; and applying the modification to the second operation portion prior to performing the first operation to the respective second data characteristic of the records.
8. The method of any one of the preceding embodiments, wherein the first operation portion is further determined based on an output of a model used for predicting one or more operation terms, and wherein the model is updated based on the result.
9. The method of any one of the preceding embodiments, wherein determining the second operation portion comprises: determining a record terminology identifier based on the first operation; comparing the record terminology identifier to a database listing terminology for users performing the first operation to determine a modification to the second operation portion; and applying the modification to the second operation portion prior to performing the first operation to the respective second data characteristic of the records.
10. The method of any one of the preceding embodiments, further comprising: determining a first authorization level for the first user; and comparing the first authorization level to a database listing authorization levels corresponding to each of a plurality of operation types to determine whether to perform the first operation.
11. The method of any one of the preceding embodiments, further comprising: determining a first authorization level corresponding to the modification characteristic; and comparing the first authorization level to a database listing authorization levels corresponding to modification characteristics to validate the plurality of respective data labels based on the first authorization level.
12. The method of any one of the preceding embodiments, further comprising: determining, based on the modification characteristic, a first role of a second user that previously modified the stateless value; and comparing the first role to a database listing roles authorized to modified stateless values to validate the plurality of respective data labels based on the first role.
13. The method of any one of the preceding embodiments, wherein determining the first operation portion further comprises: determining a relationship between the first data characteristic and the second data characteristic; and generating the first operation portion based on the relationship.
14. The method of any one of the preceding embodiments, wherein the determining first operation portion further comprises: determining a first value set identifier based on the second data characteristic; and comparing the first value set identifier to a database listing characteristic sets corresponding to the first value set identifier to generate the first operation portion.
15. The method of any one of the preceding embodiments, wherein generating for display, on the user interface, the result for the first operation comprises: receiving a plurality of content published to an application programming interface ("API") based on the result; and filtering the plurality of content using a first user display setting for the first user.
16. The method of any one of the preceding embodiments, wherein generating for display, on the user interface, the result for the first operation further comprises: determining, based on a first user, a respective authorization requirement for a plurality of content related to the result; and comparing the respective authorization requirement to a respective threshold authorization requirement to determine whether to publish the plurality of content.
17. The method of any one of the preceding embodiments, further comprising: receiving, from a first user, a first request to access a data change repository, wherein the data change repository comprises a plurality of records with a plurality of respective data labels, wherein each of the plurality of respective data labels comprises a first data characteristic and a second data characteristic, wherein the first data characteristic comprises a stateless value, and wherein the second data characteristic comprises a modification characteristic of the stateless value; receiving, from the first user, a first validation request for a first record of the plurality of records; determining a first validation function for validating the data change repository, wherein the first validation function comprises a first validation process selected based on the first data characteristic and a second validation process selected based on the second data characteristic; performing a first validation of the first record by applying the first validation process to the first data characteristic; performing a second validation of the first record by applying the second validation process to the second data characteristic; and generating for display, on a user interface, a result for the first validation request based on the first validation and the second validation.
18. The method of any one of the preceding embodiments, wherein generating for display, on the user interface, the result for the first validation request comprises: receiving a plurality of content published to an API based on the result; and filtering the plurality of content using a first user display setting for the first user.
19. The method of any one of the preceding embodiments, wherein generating for display, on the user interface, the result for the first validation request further comprises: determining, based on a first user, a respective authorization requirement for a plurality of content related to the result; and comparing the respective authorization requirement to a respective threshold authorization requirement to determine whether to publish the plurality of content.
20. The method of any one of the preceding embodiments, wherein performing a first validation of the first record by applying the first validation process to the first data characteristic further comprises: selecting a first validation algorithm based on a first schema of the first data characteristic; and processing each respective first data characteristics for the plurality of respective data labels using the first validation algorithm.
21. The method of any one of the preceding embodiments, wherein performing the first validation of the first record by applying the first validation process to the first data characteristic comprises: generating a masked version of the plurality of respective data labels, wherein the masked version of the plurality of respective data labels masks respective first data characteristics; and applying the first validation process to a masked first data characteristic.

22. The method of any one of the preceding embodiments, wherein performing the second validation of the first record by applying the second validation process to the second data characteristic further comprises: determining a respective record type identifier for each of the plurality of respective data labels; and inputting the respective record type identifier into a database listing schemas corresponding to record type identifiers to determine a respective set of database objects for each of the plurality of respective data labels.

23. The method of any one of the preceding embodiments, wherein performing the second validation of the first record by applying the second validation process to the second data characteristic further comprises: determining a modification to the second validation process based on the respective set of database objects; and applying the modification to the second validation process.

24. The method of any one of the preceding embodiments, wherein the first validation function is further determined based on an output of a model used for predicting one or more validation functions, and wherein the model is updated based on the result.

25. The method of any one of the preceding embodiments, wherein performing the second validation of the first record by applying the second validation process to the second data characteristic further comprises: determining a record terminology identifier based on the second data characteristic; comparing the record terminology identifier to a database listing terminology for records with the second data characteristic to determine a modification to the second validation process; and applying the modification to the second validation process.

26. The method of any one of the preceding embodiments, further comprising: determining a first authorization level corresponding to the modification characteristic; and comparing the first authorization level to a database listing authorization levels corresponding to modification characteristics to validate the plurality of respective data labels based on the first authorization level.

27. The method of any one of the preceding embodiments, further comprising: determining, based on the modification characteristic, a first role of a second user that previously modified the stateless value; and comparing the first role to a database listing roles authorized to modified stateless values to validate the plurality of respective data labels based on the first role.

28. The method of any one of the preceding embodiments, wherein determining the first validation function for validating the data change repository further comprises: determining a relationship between the first data characteristic and the second data characteristic; and selecting the first validation process based on the relationship.

29. The method of any one of the preceding embodiments, further comprising: determining a first value set identifier based on the second data characteristic; and comparing the first value set identifier to a database listing characteristic sets corresponding to the first value set identifier to determine the first data characteristic for performing the first validation.

30. The method of any one of the preceding embodiments, further comprising: receiving, from a first user, a first request to access a data change repository, wherein the data change repository comprises a plurality of records with a plurality of respective data labels, wherein each of the plurality of respective data labels comprises a first data characteristic and a second data characteristic, wherein the first data characteristic comprises a stateless value, and wherein the second data characteristic comprises a modification characteristic of the stateless value; receiving a second request to apply a first operation to the plurality of records in the data change repository; determining a first operation portion for performing the first operation on the first data characteristic and a second operation portion for performing the first operation on the second data characteristic; performing, based on the first operation portion, the first operation to respective first data characteristics of the plurality of respective data labels; performing, based on the second operation portion, the first operation to a respective second data characteristic of the plurality of respective data labels; and generating for display, on a user interface, a result for the first operation based on performing the first operation portion and the second operation portion, wherein the result comprises the first data characteristic.

31. The non-transitory, computer-readable medium of claim 16, wherein performing, based on the second operation portion, the first operation to the respective second data characteristic of the records further comprises: selecting a first algorithm based on a first schema of the first data characteristic and the first operation; and processing each of the respective first data characteristics for the plurality of respective data labels using the first algorithm.

32. The non-transitory, computer-readable medium of claim 16, wherein generating for display, on the user interface, the result for the first operation further comprises: determining, based on a first user, a respective authorization requirement for a plurality of content related to the result; and comparing the respective authorization requirement to a respective threshold authorization requirement to determine whether to publish the plurality of content.

33. The non-transitory, computer-readable medium of claim 16, wherein determining the first operation portion comprises: determining a respective record type identifier for each of the plurality of respective data labels; and inputting the respective record type identifier into a database listing schemas corresponding to record type identifiers to determine a respective set of database objects for each of the plurality of respective data labels.

34. The non-transitory, computer-readable medium of claim 19, wherein determining the second operation portion comprises: determining a modification to the second operation portion based on the respective set of database objects; and applying the modification to the second operation portion prior to performing the first operation to the respective second data characteristic of the records.

35. A tangible, non-transitory, machine-readable medium storing instructions that, when executed by a data processing apparatus, cause the data processing apparatus to perform operations comprising those of any of embodiments 1-34.

36. A system comprising one or more processors; and memory storing instructions that, when executed by the processors, cause the processors to effectuate operations comprising those of any of embodiments 1-34.

37. A system comprising means for performing any of embodiments 1-34.

What is claimed is:

1. A system for executing operations across data change repositories that comprise sensitive data in shared data resources, the system comprising:
one or more processors; and
a non-transitory, computer-readable medium comprising instructions that when executed by the one or more processors cause operations comprising:
receiving, from a first user, a first request to access a data change repository, wherein the data change repository comprises a plurality of records with a plurality of respective data labels, wherein each of the plurality of respective data labels comprises a first data characteristic and a second data characteristic, wherein the first data characteristic comprises a stateless value, and wherein the second data characteristic comprises a modification characteristic of the stateless value;
receiving a second request to apply an operation to the plurality of records in the data change repository;
generating a masked version of each of the plurality of respective data labels, wherein the masked version of each respective data label masks respective first data characteristics;
determining a relationship between the first data characteristic and the second data characteristic;
determining a first operation portion for performing a first operation on the first data characteristic and a second operation portion for performing the first operation on the second data characteristic, and wherein the first operation portion is selected based on the relationship;
performing, based on the first operation portion, the first operation to respective masked first data characteristics of the plurality of respective data labels;
performing, based on the second operation portion, the first operation to a respective second data characteristic of the plurality of records; and
generating for display, on a user interface, a result for the first operation based on performing the first operation portion and the second operation portion, wherein the result comprises a masked first data characteristic.

2. A method for executing operations across data change repositories that comprise sensitive data in shared data resources, the method comprising:
receiving, from a first user, a first request to access a data change repository, wherein the data change repository comprises a plurality of records with a plurality of respective data labels, wherein each of the plurality of respective data labels comprises a first data characteristic and a second data characteristic, wherein the first data characteristic comprises a stateless value, and wherein the second data characteristic comprises a modification characteristic of the stateless value;
receiving a second request to apply a first operation to the plurality of records in the data change repository;
generating a masked version of each of the plurality of respective data labels, wherein the masked version of each respective data label masks respective first data characteristics;
determining a first operation portion for performing the first operation on the first data characteristic and a second operation portion for performing the first operation on the second data characteristic;
performing, based on the first operation portion, the first operation to respective masked first data characteristics of the plurality of respective data labels;
performing, based on the second operation portion, the first operation to a respective second data characteristic of the plurality of respective data labels; and
generating for display, on a user interface, a result for the first operation based on performing the first operation portion and the second operation portion, wherein the result comprises a masked first data characteristic.

3. The method of claim 2, wherein performing, based on the second operation portion, the first operation to the respective second data characteristic of the plurality of records further comprises:
selecting a first algorithm based on a first schema of the first data characteristic and the first operation; and
processing each of the respective first data characteristics for the plurality of respective data labels using the first algorithm.

4. The method of claim 2, wherein generating for display, on the user interface, the result for the first operation further comprises:
determining, based on a first user, a respective authorization requirement for a plurality of content related to the result; and
comparing the respective authorization requirement to a respective threshold authorization requirement to determine whether to publish the plurality of content.

5. The method of claim 2, wherein determining the first operation portion comprises:
determining a respective record type identifier for each of the plurality of respective data labels; and
inputting the respective record type identifier into a database listing schemas corresponding to record type identifiers to determine a respective set of database objects for each of the plurality of respective data labels.

6. The method of claim 5, wherein determining the second operation portion comprises:
determining a modification to the second operation portion based on the respective set of database objects; and
applying the modification to the second operation portion prior to performing the first operation to the respective second data characteristic of the plurality of records.

7. The method of claim 2, wherein the first operation portion is further determined based on an output of a model used for predicting one or more operation terms, and wherein the model is updated based on the result.

8. The method of claim 2, wherein determining the second operation portion comprises:
determining a record terminology identifier based on the first operation;
comparing the record terminology identifier to a database listing terminology for users performing the first operation to determine a modification to the second operation portion; and
applying the modification to the second operation portion prior to performing the first operation to the respective second data characteristic of the plurality of records.

9. The method of claim 2, further comprising:
determining a first authorization level for the first user; and
comparing the first authorization level to a database listing authorization levels corresponding to each of a plurality of operation types to determine whether to perform the first operation.

10. The method of claim 2, further comprising:
determining a first authorization level corresponding to the modification characteristic; and
comparing the first authorization level to a database listing authorization levels corresponding to modification characteristics to validate the plurality of respective data labels based on the first authorization level.

11. The method of claim 2, further comprising:
determining, based on the modification characteristic, a first role of a second user that previously modified the stateless value; and
comparing the first role to a database listing roles authorized to modify stateless values to validate the plurality of respective data labels based on the first role.

12. The method of claim 2, wherein determining the first operation portion further comprises:
determining a relationship between the first data characteristic and the second data characteristic; and
generating the first operation portion based on the relationship.

13. The method of claim 2, wherein determining the first operation portion further comprises:
determining a first value set identifier based on the second data characteristic; and
comparing the first value set identifier to a database listing characteristic sets corresponding to the first value set identifier to generate the first operation portion.

14. The method of claim 2, wherein generating for display, on the user interface, the result for the first operation comprises:
receiving a plurality of content published to an application programming interface (API) based on the result; and
filtering the plurality of content using a first user display setting for the first user.

15. The method of claim 2, wherein generating for display, on the user interface, the result for the first operation further comprises:
determining, based on a first user, a respective authorization requirement for a plurality of content related to the result; and
comparing the respective authorization requirement to a respective threshold authorization requirement to determine whether to publish the plurality of content.

16. A non-transitory, computer-readable medium comprising instructions that when executed by one or more processors cause operations comprising:
receiving, from a first user, a first request to access a data change repository, wherein the data change repository comprises a plurality of records with a plurality of respective data labels, wherein each of the plurality of respective data labels comprises a first data characteristic and a second data characteristic, wherein the first data characteristic comprises a stateless value, and wherein the second data characteristic comprises a modification characteristic of the stateless value;
receiving a second request to apply a first operation to the plurality of records in the data change repository;
determining a first operation portion for performing the first operation on the first data characteristic and a second operation portion for performing the first operation on the second data characteristic;
performing, based on the first operation portion, the first operation to respective first data characteristics of the plurality of respective data labels;
performing, based on the second operation portion, the first operation to a respective second data characteristic of the plurality of respective data labels; and
generating for display, on a user interface, a result for the first operation based on performing the first operation portion and the second operation portion, wherein the result comprises the first data characteristic.

17. The non-transitory, computer-readable medium of claim 16, wherein performing, based on the second operation portion, the first operation to the respective second data characteristic of the plurality of records further comprises:
selecting a first algorithm based on a first schema of the first data characteristic and the first operation; and
processing each of the respective first data characteristics for the plurality of respective data labels using the first algorithm.

18. The non-transitory, computer-readable medium of claim 16, wherein generating for display, on the user interface, the result for the first operation further comprises:
determining, based on a first user, a respective authorization requirement for a plurality of content related to the result; and
comparing the respective authorization requirement to a respective threshold authorization requirement to determine whether to publish the plurality of content.

19. The non-transitory, computer-readable medium of claim 16, wherein determining the first operation portion comprises:
determining a respective record type identifier for each of the plurality of respective data labels; and
inputting the respective record type identifier into a database listing schemas corresponding to record type identifiers to determine a respective set of database objects for each of the plurality of respective data labels.

20. The non-transitory, computer-readable medium of claim 19, wherein determining the second operation portion comprises:
determining a modification to the second operation portion based on the respective set of database objects; and
applying the modification to the second operation portion prior to performing the first operation to the respective second data characteristic of the plurality of records.

* * * * *